Dec. 20, 1966 G. ABRAHAM 3,293,453

NEGATIVE RESISTANCE MULTISTABLE CIRCUIT SWITCHING

Filed Feb. 28, 1964 2 Sheets-Sheet 1

INVENTOR

GEORGE ABRAHAM

BY

ATTORNEY

Dec. 20, 1966 G. ABRAHAM 3,293,453
NEGATIVE RESISTANCE MULTISTABLE CIRCUIT SWITCHING
Filed Feb. 28, 1964 2 Sheets-Sheet 2

INVENTOR
GEORGE ABRAHAM
BY [signature]
ATTORNEY

United States Patent Office 3,293,453
Patented Dec. 20, 1966

3,293,453
NEGATIVE RESISTANCE MULTISTABLE CIRCUIT SWITCHING

George Abraham, 3107 Westover Drive, SE., Washington, D.C. 20020

Filed Feb. 28, 1964, Ser. No. 348,915
4 Claims. (Cl. 307—88.5)

The invention described herein may be manufactured and used by or for the Government of the United States of America for governmental purposes without the payment of any royalities thereon or therefor.

The present invention relates to multistable switching circuits and more particularly to multistable circuit switching with a single one-polarity pulse triggering source.

A variety of techniques for triggering multistable switching circuits are available to the designer. When considering the alternatives possible for triggering the the ordinary flip-flop for example, three distinct methods of triggering immediately present themselves. First, a triggering source consisting of positive and negative pulses can be applied to appropriate input trigger terminals of the flip-flop, each successive pulse changing the state of the device. A second method effects triggering by positive or negative pulses applied to appropriate set-reset terminals of the circuit, successive pulses causing set and reset respectively. The third alternative employs a steering circuit to trigger on and off with pulses of one polarity. The steering circuit directs alternate pulses to each side of the flip-flop. These methods of the prior art provide satisfactory triggering. Certain disadvantages, however, are inherent in each method. The first method requires both positive and negative pulses. The second method requires connection to both sides of the flip-flop, and the third needs additional circuitry if only unipolar pulses are to be used.

Accordingly, it is an object of the present invention to provide multistable circuit triggering from a single one-polarity pulse source without a pulse steering circuit.

It is another object of the present invention to provide a multistable switching circuit capable of being triggered by a single source of unipolar pulses consistently applied to the same terminal thereof.

Another object is to provide a mulstistable switching circuit having a negative resistance device as the only active element, the negative resistance characteristic of which is utilized to enable one terminal, single one-polarity pulse source triggering.

The present invention presents a method of triggering multistable circuits free from the limitations of the triggering techniques presently available. Using a negative resistance device as the active unit, the internal device phenomenon is utilized with an input capacitor and a load resistor of preselected values to realize unipolar pulse switching from a single source without the use of pulse steering.

The nature of this invention as well as other objects and advantages thereof will be readily apparent from consideration of the accompanying driwings, in which.

Figure 1:
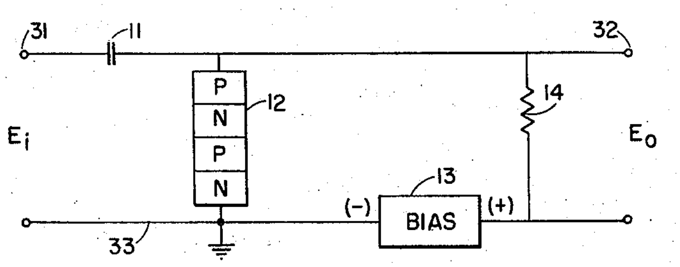
FIGURE 1 illustrates a multistable switching circuit which is the preferred embodiment of the present invention.

Referring to the drawings, wherein like reference characters refer to like parts throughout, there is illustrated in FIGURE 1 a four-layer avalanche or Shockley diode 12, the active element of this multistable switching circuit. Capacitor 11 connects the source of input or triggering pulses applied to terminal 31 to the diode. The positive side of the power supply or bias source 13 is applied to the avalanche diode via the output impedance resistor 14 at the output 32 of this circuit, with the negative side connected to common 33. The output voltage *Eo* is realized across resistor 14.

Figure 2:
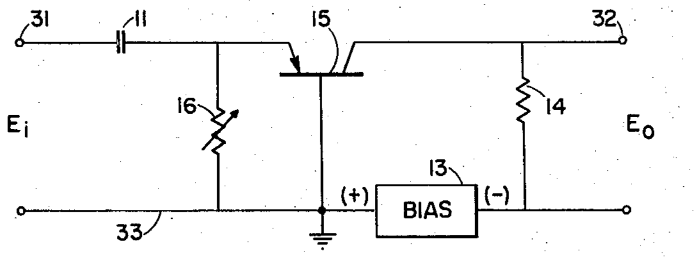
FIGURE 2 shows another multistable switching circuit.

The multistable circuit of FIGURE 2 utilizes a transistor as the active element. Multistable operation is obtained by biasing the transistor so that it operates in the avalanche mode, i.e. the positive side of bias 13 is grounded here, while the negative side is connected to the output terminal via the output resistor 14. The additional element in this circuit, not shown in FIGURE 1, is the variable resistor 16. This resistor, often supplemented by an additional bias in the emitter-base circuit of the transistor, serves to lower the steady state output voltage of the negative resistance characteristic so that it more nearly resembles the more practical curve of the four-layer diode, as shown in FIGURE 5.

Figure 3:
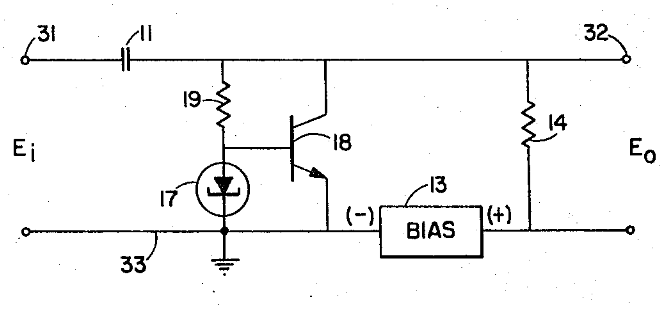
FIGURE 3 shows a third multistable switching circuit.

FIGURE 3 shows an alternative embodiment of the multistable switching circuit of the present invention, in which a tunnel diode 17 is the negative resistance active element. The negative resistance characteristic of the tunnel diode is of the kind designated S-type or voltage-stable, as opposed to the N-type or current-stable negative resistance characteristic realized with avalanche breakdown, as shown in FIGURE 5. The S-type curve would appear to be identical to that show in FIGURE 5 if the ordinate axis represented current instead of voltage and the abscissa were voltage instead of current. With the axes as shown in this figure, the letter S would appear instead of the N as shown, i.e. starting from the origin, a low positive resistance state would be followed by a region of negative resistance and finally the third state would be the high positive resistance region more parallel to the voltage ordinate axis as is the first state of the N-type curve shown. The S-type curve of tunnel diode 17, connected across the emitter-base junction of transistor 18, appears as an N-type negative resistance characteristic, as seen across the output impedance 14 which is connected to the collector and emitter terminals via the bias 13. The normal 180° phase shift realized by a signal applied to the base of a transistor or grid of a vacuum tube for small signal amplification, as seen at resistor 14 in the collector circuit, is responsible for this inversion. Resistor 19, connected in series with the tunnel diode serves merely to limit the current through that device. Except for the negative resistance characteristic inversion discussed above and the bias 13, which as in FIGURE 1, is again connected negative to common and positive to output 32 via resistor 14, this multistable switching circuit of FIGURE 3 provides the same circuit function as the embodiments of FIGURES 1 and 2.

*Operation*

Figure 4:
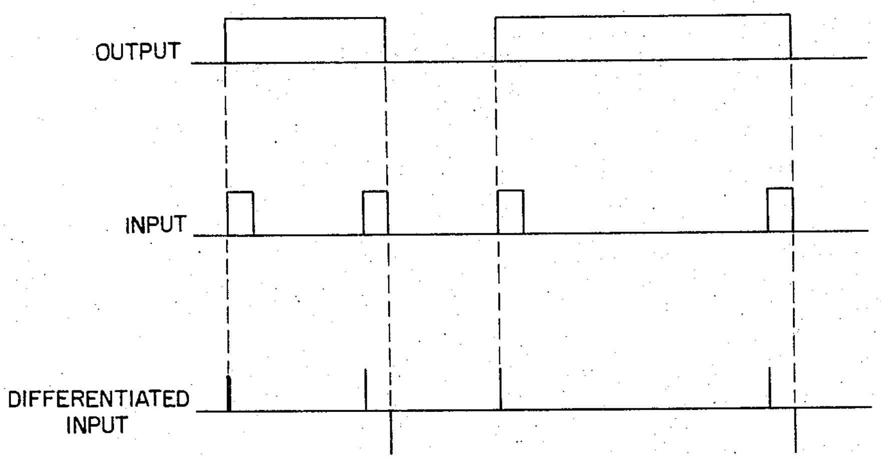
FIGURE 4 is a graphical representation of the input and output pulse forms of the present invention.
Figure 5:
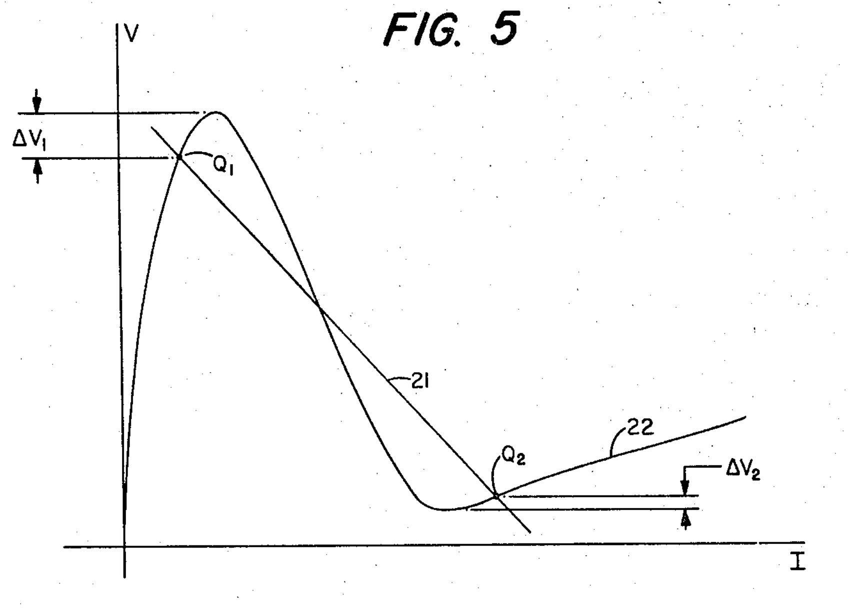
FIGURE 5 is a graphical representation of the negative resistance characteristic.

FIGURES 4 and 5 will be used in describing the operation of the present invention. To realize the objects of the present invention, to provide a multistable switching circuit capable of being triggered by a single source of one-polarity pulses consistently applied to the same terminal thereof, certain operating parameters must be specified. In order for positive pulses applied at the input terminal 31 of the switching circuits to cause the negative resistance device to switch from one state to the other, from off to on for example, it is necessary that the input pulses be differentiated. FIGURE 4 shows one-polarity pulses, positive in this figure, as applied to the multistable switching circuit, the pulses being labeled "input" in the figure. Differentiation of these pulses is occasioned by series capacitor 11 and the shunt resistance of the negative resistance device. The requirements for differentiation in this typical series C-shunt R differentiation circuit is that the value of R be very small compared with the capacitive reactance of the capacitor. It thus becomes apparent that the internal characteristics of the negative resistance device chosen determines in part the value that must be selected for the capacitor 11 in the multistable switching circuit.

FIGURE 5 is used to illustrate this essential relationship between the capacitor 11 and the resistance of the negative resistance device necessary for differentiation. Before the application of the first pulse, the negative resistance device is in the off (or high impedance) state, having quiescent point $Q_1$ as its position of stability. The slope of the curve at this point, it should be noticed, is close to the ordinate axis which if parallel thereto would represent an infinite impedance. The actual impedance realized is thus in the order of megohms. At the application of the first pulse, the amplitude of which must be greater than $\Delta V_1$, the voltage change necessary to trigger the negative resistance device to the second stable state $Q_2$, switching takes place. Here at $Q_2$, the resistance is low, in the order of ohms, and the relationship between resistance of the negative resistance device and the capacitive reactance of capacitor 11 necessary for differentiation is realized. The second pulse applied to this R-C network is thus differentiated. As shown in FIGURE 4, the rise of the second pulse appears as a positive spike which has no effect on the negative resistance device since it is already in the "on" state. The decay of this pulse appears as a negative spike. This negative spike needs only to present a negative-going change in voltage greater than $\Delta V_2$, the increment of voltage necessary to trigger the negative resistance device back to the "off" state at $Q_1$.

Several observations can be made at this point. In FIGURE 4 the pulses labeled "output," the output voltage of the multistable switching circuit, evidences what has just been described as having taken place. The output voltage rises at the instant of the rise of the first input pulse and returns to the off state with the spike occasioned by the differentiated decay of the second input pulse. Also, while not shown in this figure, negligible differentiation takes place at the instance of the first pulse due to the presence of the series capacitor and the shunt resistor. For the purposes of the present invention, however, this small amplitude differentiated pulse has no effect on the operation, and was therefore shown as an absence of differentiation.

The amplitude requirements of the input pulses has been shown to be that needed to overcome the positive peak of the negative resistance characteristic, as shown in FIGURE 5. The pulse width is also critical. The duration of the pulse must be short compared to the response time of the negative resistance circuit. If this requirement were not observed the very pulse that turns the device on would also be differentiated and turn the device off.

The necessary relationship between output impedance 14, the input pulses and the negative resistance characteristic is clearly shown in FIGURE 5. The line 21 is the load line occasioned by this resistor. Output impedance 14 must be less than the negative resistance of the negative resistance device for bistable operation. The exact value of this resistor designates the position of the quiescent points $Q_1$ and $Q_2$ for a specified value of bias.

Having these points of stability specified, the amplitude of the input pulses required for triggering is determined. It thus becomes apparent that to obtain triggering of a multistable switching circuit from a single source of unipolar pulses connected to only one set of terminals of the circuit, the interrelationships between the elements of said circuit and the operating conditions must be carefully selected.

While the embodiments shown in FIGURES 1 and 2 utilize a Schockley diode and a transistor operating in the avalanche mode, it should be understood that a neon tube, other gas breakdown tubes or a silicon controlled rectifier could as well be used. Other devices such as a tetrode vacuum tube operating as a dynatron could be used for generating the S-type negative resistance characteristic in place of the tunnel diode shown in FIGURE 3.

It should further be noted that while the preferred embodiment and the alternative embodiments show bistable operation, multistable operation of three or more stable states is not only possible but contemplated by the present invention. Such multistable operation is shown in this inventor's U.S. Patent 2,939,965 and in application for Letters Patent, 86,262, filed January 31, 1961.

Since various changes and modifications may be made in the practice of the invention herein described without departing from the spirit or scope thereof, it is intended that the foregoing description shall be taken primarily by way of illustration and not in limitation except as may be required by the appended claims.

What is claimed is:

1. A multistable switching circuit triggerable by single-polarity pulses comprising:
- a terminal for receiving single-polarity pulses;
- a negative resistance device;
- a capacitor connecting said terminal to said negative resistance device;
- said capacitor having a value proportioned relative to the resistance of said negative resistance device, such that the pulses applied to said negative resistance device are differentiated;
- output impedance means connected to said negative resistance device;
- said output impedance means having a value proportioned relative to the resistance of said negative resistance device such that said negative resistance device is caused to operate in a bistable mode, thereby being triggered alternately to high and low conductive states by successive pulses.

2. A multistable switching circuit as recited in claim 1 wherein the width of said pulses is short compared to the response time of said negative resistance device.

3. A multistable switching circuit as recited in claim 2 wherein said negative resistance device operates in an avalanche mode.

4. A multistable switching circuit as recited in claim 2 wherein said negative resistance device is a transistor biased to operate in the avalanche mode.

References Cited by the Examiner

UNITED STATES PATENTS 3,150,273 9/1964 DYM ------------ 307—88.5

OTHER REFERENCES

Uzunoglu: "A New Look At Negative Resistance Devices," Electronics (mag.), March 8, 1963 (pp. 35 to 39), (pages 38 and 39 relied on).

ARTHUR GAUSS, *Primary Examiner.*

D. D. FORRER, *Assistant Examiner.*